US006979973B2

United States Patent
Yoo

(10) Patent No.: US 6,979,973 B2
(45) Date of Patent: Dec. 27, 2005

(54) APPARATUS TO AND METHOD OF CONTROLLING STEP MOTOR

(75) Inventor: Si-hun Yoo, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 10/960,544

(22) Filed: Oct. 8, 2004

(65) Prior Publication Data

US 2005/0122080 A1    Jun. 9, 2005

(30) Foreign Application Priority Data

Dec. 9, 2003  (KR) .................. 10-2003-0089080

(51) Int. Cl.[7] ............................................. H02P 8/00
(52) U.S. Cl. ................... 318/696; 318/685; 318/567; 318/569
(58) Field of Search ................. 318/696, 685, 318/567, 569

(56) References Cited

U.S. PATENT DOCUMENTS 6,270,176 B1 *  8/2001  Kahle ............................. 347/2
6,442,437 B1    8/2002  Yu et al.

FOREIGN PATENT DOCUMENTS

| JP | 56-066196 | 6/1981 |
| JP | 57-050004 | 3/1982 |
| JP | 59-145180 | 8/1984 |
| JP | 03-041501 | 2/1991 |
| JP | 09-282024 | 10/1997 |
| JP | 2001-238492 | 8/2001 |
| KR | 1999-003236 | 1/1999 |
| KR | 1999-0052570 | 7/1999 |

* cited by examiner

Primary Examiner—Karen Masih
(74) Attorney, Agent, or Firm—Stanzione & Kim, LLP

(57) ABSTRACT

An apparatus to and method of controlling a step motor by checking driving pulses to control the operation of the step motor and resetting the apparatus controlling the step motor when signals indicating an abnormal operation, such as stepping out, of the step motor are detected, thereby preventing a fire or damage to parts caused by the abnormal operation of the step motor.

22 Claims, 4 Drawing Sheets

APPARATUS TO AND METHOD OF CONTROLLING STEP MOTOR

CROSS-REFERENCE TO RELATED APPLICATIONS

This application claims the priority of Korean Patent Application No. 2003-89080, filed on Dec. 9, 2003, in the Korean Intellectual Property Office, the disclosure of which is incorporated herein in its entirety and by reference.

BACKGROUND OF THE INVENTION

1. Field of the Invention

The present general inventive concept relates to an apparatus to and method of controlling a step motor, and more particularly, to an apparatus to and method of controlling a step motor by checking signals to control an operation of the step motor and resetting the apparatus controlling the step motor when signals indicating an abnormal operation, such as stepping out, of the step motor are detected, thereby preventing a fire or damage to parts caused by the abnormal operation of the step motor.

2. Description of the Related Art

A step motor rotates by a predetermined step angle in response to a pulse signal. The step motor has been widely used as a driving source for factory automation (FA) or office automation (OA) applications and, accordingly, the demand for a high-performance step motor has increased. In particular, the step motor is widely used as the driving source of inkjet printers, scanners, facsimiles, and laser printers that require highly precise position control and low noise level in various speed ranges.

The step motor may be settled by a combination of an excitation method and a driving method. The excitation method is classified into one-phase, two-phase, three-phase, and four-phase excitation methods according to the number of phases to which electric current flows at a time. The driving method is classified into a unipolar driving method in which electric current flows in a fixed direction and a bipolar driving method in which the electric current flows in a variable direction.

Hereinafter, the operation of the step motor will be described using the unipolar two-phase excitation method. FIG. 1 illustrates the operation of a conventional step motor using the unipolar two-phase excitation method.

Referring to FIG. 1, each of step motors 101, 102, 103, and 104 includes a stator and a rotor. When the stator is magnetized, the rotor including a magnet rotates around the magnetized stator. In other words, when the step motors 101, 102, 103, and 104 are to be driven in a clockwise (CW) direction, the stators thereof are excited in the sequence (A1, B1), (B1, A2), (A2, B2), and (B2, A1), respectively. Conversely, when the step motors 101, 102, 103, and 104 are to be driven in a counter clockwise (CCW) direction, the stators thereof are excited in the sequence (B1, A1), (A1, B2), (B2, A2), and (A2, B1), respectively.

FIG. 2 is a graph illustrating a linear acceleration/deceleration to prevent a conventional step motor from stepping out. Referring to FIG. 2, it is assumed that a step motor is used as a driving motor of a printer and rotates in the CW direction, thereby linearly driving a printer unit. In this case, the driving section of the step motor is divided into an accelerating section 200, a constant speed section 201, and a decelerating section 202. In the accelerating section 200, the step motor accelerates until it reaches a certain speed. In the constant speed section 201, the step motor moves at a constant speed. In the decelerating section 202, the step motor decelerates until it comes to a halt. When the step motor is driven in the CCW direction, its driving section is also divided into an accelerating section 204, a constant speed section 205, and a decelerating section 206. There is a suspension section 203 between the driving section of the CW direction and the driving section of the CCW direction. Reference symbol L indicates a distance traveled by a sheet of paper in the driving section of the CW direction.

In this conventional method of controlling a step motor, an acceleration/deceleration table (or an acceleration/deceleration lookup table) is used to enable the step motor to reach a desired speed. The acceleration/deceleration table is stored in a memory such as a read only memory (ROM) or a random access memory (RAM).

FIG. 3 is a block diagram of a conventional apparatus controlling a step motor. The apparatus includes a memory 420, a controller 410, a step motor driver 430, and the step motor 440. To control the step motor 440, the controller 410, which controls the step motor driver 430, generates an interrupt in the memory 420 whenever driving the step motor 440, reads an acceleration/deceleration table value, and controls the speed of the step motor 440.

Another conventional method of controlling a step motor in a stable manner by time adjustment is disclosed in U.S. Pat. No. 6,442,437.

Referring back to FIG. 2, to prevent the step motor from stepping out in the accelerating section 200, pulses are transmitted at irregular intervals. Generally, a step motor steps out when the driving torque is more than its pull-out torque. "Stepping out" refers to cases where the number of pulses transmitted to the step motor does not match the actual rotation of the step motor. To prevent this, in the accelerating section, pulse frequencies are set to a value smaller than target pulse frequencies as illustrated in FIG. 2.

Referring back to FIG. 3, in response to a step motor start signal, the controller 410 reads an acceleration/deceleration value stored in the memory 420, converts the acceleration/deceleration value into a predetermined step motor driving pulse, and transmits the step motor driving pulse to the step motor driver 430 such that the step motor 440 can be driven without stepping out.

When stopping the step motor 440, the controller 410 reads an acceleration/deceleration table value stored in the memory 420, converts the detected acceleration/deceleration table value into a predetermined step motor driving pulse, and transmits the step motor driving pulse to the step motor driver 430 such that the step motor 440 can be stopped without stepping out.

However, in this method of driving the step motor 440 according to the acceleration/deceleration table value, when the step motor 440 is driven abnormally, for example, when the step motor 440 steps out due to unexpected problems, the controller 410 fails to check the abnormal operation of the step motor 440, which may cause a fire or damage to motor parts due to an inflow of excess current.

SUMMARY OF THE INVENTION

The present general inventive concept provides an apparatus to and method of controlling a step motor by checking signals to control an operation of the step motor and resetting the apparatus controlling the step motor when signals indicating an abnormal operation, such as stepping out, of the step motor, thereby preventing a fire or damage to parts caused by the abnormal operation of the step motor.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are be achieved by providing an apparatus to control a step motor, the apparatus including a memory storing data to drive the step motor; a step motor driver driving the step motor; a controller controlling the memory and the step motor driver, converting the data read from the memory into a predetermined step motor driving pulse, and outputting the step motor driving pulse to the step motor driver; a watchdog timer checking a state of the step motor driving pulse and generating a reset request signal when there is a problem with the state of the step motor driving pulse; and a reset timer generating a reset signal in response to the reset request signal generated by the watchdog timer.

The watchdog timer may check a central processing unit (CPU) included in the controller and generate the reset request signal when the CPU is latched up. The watchdog timer may detect the step motor driving pulse and generate the reset request signal when duty enable time of the step motor driving pulse exceeds a predetermined period of time. The watchdog timer may remain in a standby mode when a driving enable signal of the step motor is off.

The foregoing and/or other aspects and advantages of the present general inventive concept are also be achieved by providing a method of controlling a step motor used by an apparatus to control the step motor, the apparatus including a memory storing data to drive the step motor, a step motor driver driving the step motor, and a controller controlling the memory and the step motor driver, converting the data read from the memory into a predetermined step motor driving pulse, and outputting the step motor driving pulse to the step motor driver. The method includes checking a state of the step motor driving pulse and resetting the apparatus when there is a problem with the state of the step motor driving pulse.

The method may further include checking the state of the step motor driving pulse and generating a reset request signal when there is a problem with the state of the step motor driving pulse; and generating a reset signal to reset the apparatus in response to the reset request signal. The reset request signal may be generated by a watchdog timer checking the state of the step motor driving pulse, and the reset signal may be generated by the reset timer connected to the watchdog timer.

The method may further include checking a CPU included in the controller and generating the reset request signal when the CPU is latched up; and detecting the step motor driving pulse and generating the reset request signal when a duty enable time of the step motor driving pulse exceeds a predetermined period of time.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
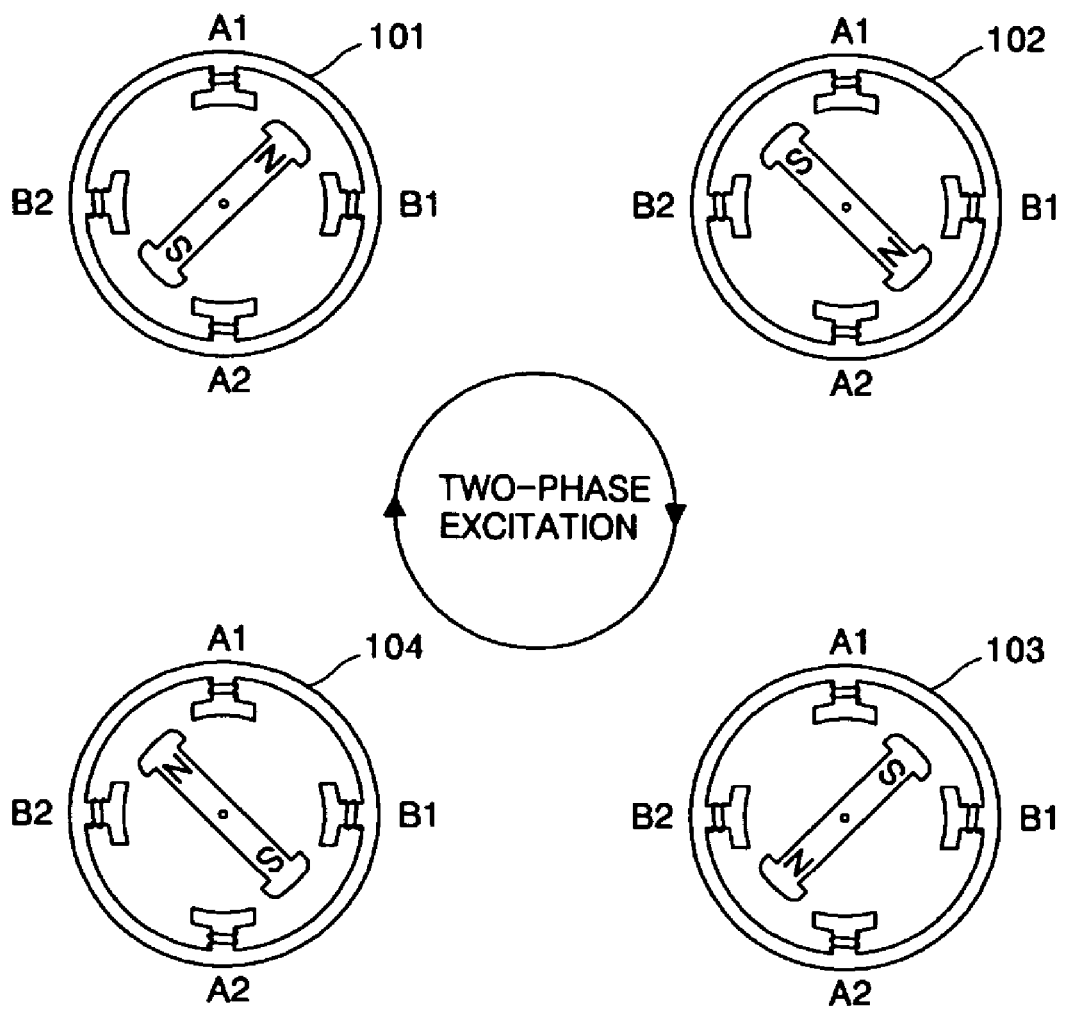
FIG. 1 illustrates an operation of a conventional unipolar step motor.
Figure 2:
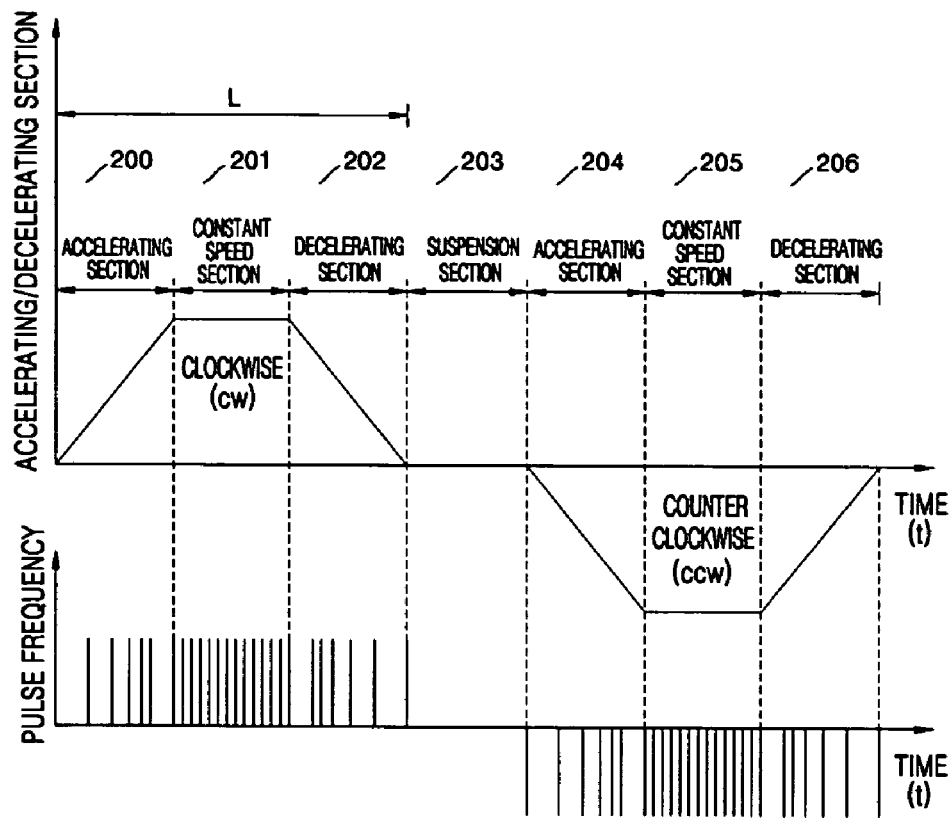
FIG. 2 is a graph illustrating a linear acceleration/deceleration for preventing a conventional step motor from stepping out.
Figure 3:
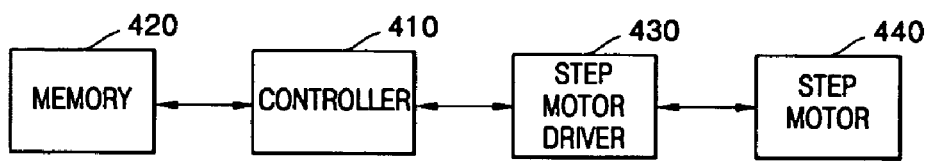
FIG. 3 is a block diagram of a conventional apparatus controlling a step motor.

The present general inventive concept will now be described more fully with reference to the accompanying drawings, in which exemplary embodiments of the general inventive concept are shown. The invention may, however, be embodied in many different forms and should not be construed as being limited to the embodiments set forth therein; rather, these embodiments are provided so that this disclosure will be thorough and complete, and will fully convey the general inventive concept to those skilled in the art. Like reference numerals in the drawings denote like elements, and thus their description will omitted.

Figure 4:
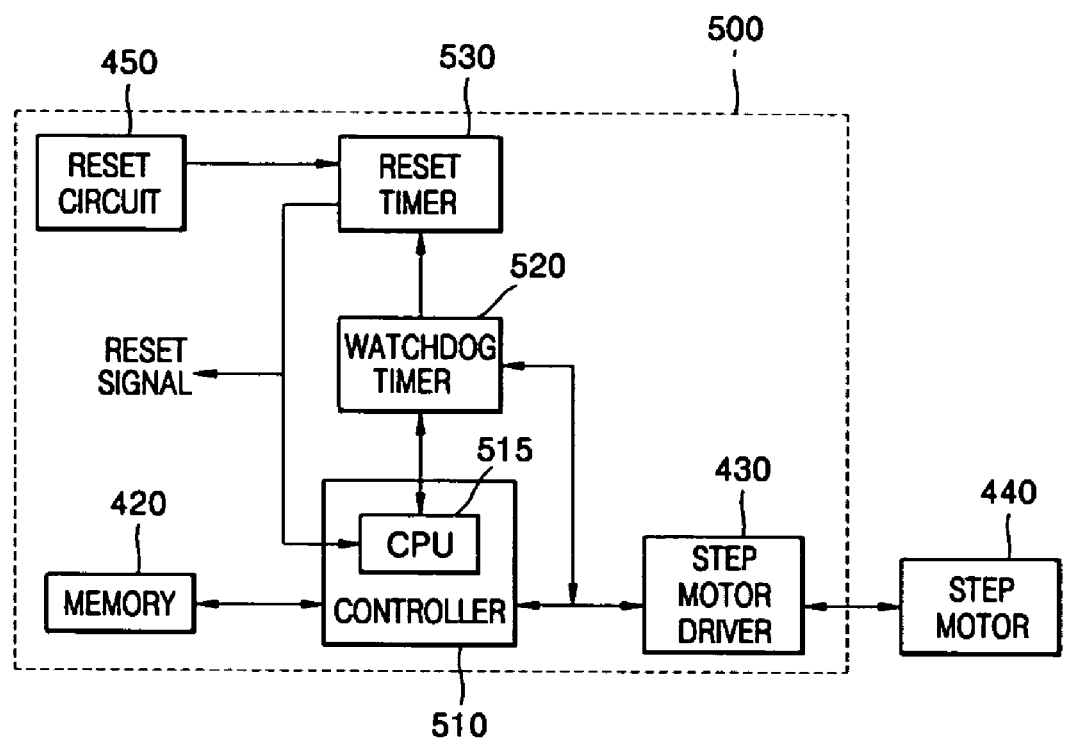
FIG. 4 is a block diagram of an apparatus to control a step motor, according to an embodiment of the present general inventive concept.

FIG. 4 is a block diagram of an apparatus to control a step motor, according to an embodiment of the present general inventive concept. Referring to FIG. 4, the apparatus 500 includes a memory 420, a step motor driver 430, and a controller 510. The memory 420 stores data to drive the step motor 440, and the step motor driver 430 drives the step motor 440. The controller 510 controls the memory 420 and the step motor driver 420, converts data read from the memory 430 into a predetermined step motor driving pulse, and outputs the step motor driving pulse to the step motor driver 430. The controller 510 includes a central processing unit (CPU) 515 processing data and signals related to controlling the step motor 440. The controller 510 generates an interrupt in the memory 420 whenever driving the step motor 440 by controlling the step motor driver 430 and controls the speed of the step motor 440 by reading acceleration and deceleration table values stored in the memory 420.

In addition, the apparatus 500 includes a watchdog timer 520 and a reset timer 530. The watchdog timer 520 checks the state of the step motor driving pulse and generates a reset request signal when there is a problem with the state of the step motor driving pulse. In response to the reset request signal generated by the watchdog timer 520, the reset timer 530 generates a reset signal to reset the apparatus 500 or the CPU 510. The apparatus 500 also includes a reset circuit 450 transmitting a hardware reset signal to the reset timer 530 when the power of the apparatus 500 is on.

The watchdog timer 520 detects the step motor driving pulse and generates the reset request signal when a duty enable time of the step motor driving pulse exceeds a predetermined period of time (e.g., more than twice the duty enable time). In addition, the watchdog timer 520 checks the state of the CPU 515 and generates the reset request signal when the CPU 515 is latched up. In response to the reset request signal generated by the watchdog timer 520, the reset timer 530 resets the apparatus 500, thereby initializing the entire operation of the apparatus 500. Further, when the power of the apparatus 500 is on, the reset timer 530 also initializes the CPU 515 and a variety of input/output ports (not shown) in response to the hardware reset signal generated by the reset circuit 450.

Figure 5:
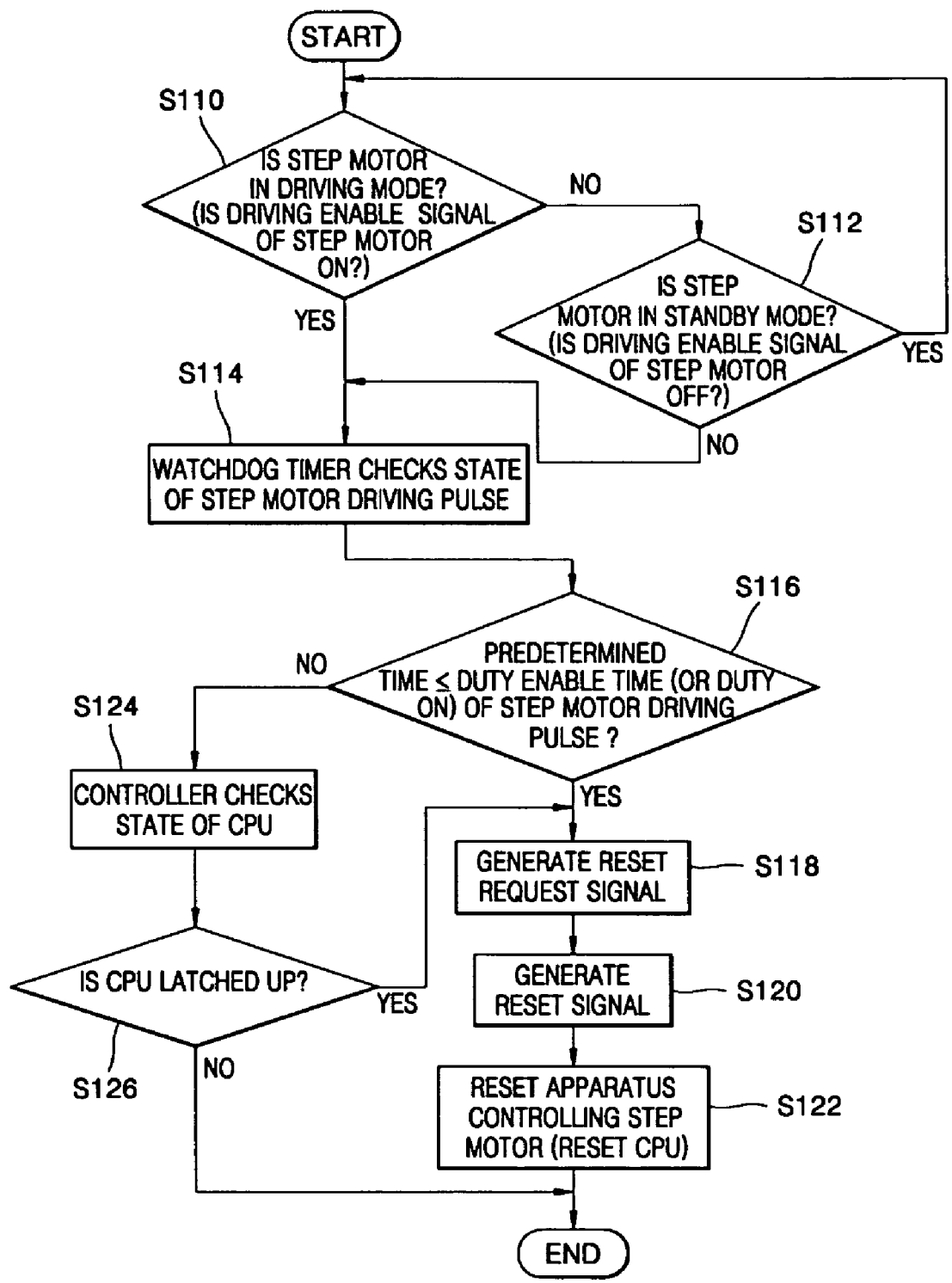
FIG. 5 is a flowchart illustrating a method of controlling a step motor, according to another embodiment of the present general inventive concept.

FIG. 5 is a flowchart illustrating a method of controlling a step motor according to an embodiment of the present general inventive concept. Referring to FIG. 5, when the power of the apparatus 500 is on, the controller 510 checks whether the step motor 440 is in the driving mode (operation S110). Those skilled in the art will understand that, when the power of the apparatus 500 is on, the reset circuit 450 generates the hardware reset signal before the controller 510 checks whether the step motor 440 is in the driving mode, and initializes the CPU 515 and a variety of input/output ports (not shown).

In operation S110, the controller 510 checks whether the step motor 440 is in the driving mode by checking whether a driving enable signal of the step motor 440 is on. In other words, when the driving enable signal of the step motor 440 is on, the controller 510 determines that the step motor 440 is in the driving mode. When the driving enable signal of the step motor 440 is off, the controller 510 determines that the step motor 440 is in a standby mode (operation S112).

When it is determined that the step motor 440 is in the driving mode in operation S110 or when it is determined that the step motor 440 is not in the standby mode in operation S112, the watchdog timer 520 checks the state of a driving pulse output from the controller 510 (operation S114). If the duty enable time (or duty-on time) of the driving pulse exceeds a predetermined period of time (for example, more than twice the duty-on time), the watchdog timer 520 generates the reset request signal (operations S116 and S118). If the duty enable time does not exceed the predetermined period of time, the watchdog timer 520 checks the state of the CPU 515 (operation S124).

After checking the state of the CPU 515, when it is determined that the CPU 515 is latched up (operation S126), the watchdog timer 520 generates the reset request signal (operation S120). In response to the reset request signal generated by the watchdog timer 520, the reset timer 530 generates the reset signal, thereby resetting the CPU 515 or the apparatus 500 controlling step motor 440 (operation S122).

In this way, the present general inventive concept may prevent a fire or damage to parts of the motor caused by the stepping-out of a step motor employed in a device such as a facsimile or a printer and the latch-up of a CPU.

As described above, in an apparatus to and method of controlling a step motor according to embodiment of the present general inventive concept, signals to control the operation of the step motor are checked. When there are signals indicating an abnormal operation of the step motor, such as stepping out, the apparatus controlling the step motor is reset, thereby preventing a fire or damage to parts caused by the abnormal operation of the step motor.

The present general inventive concept can be realized as a method, an apparatus, and a system. When the present general inventive concept is manifested in computer software, components of the present general inventive concept may be replaced with code segments that are necessary to perform the required action. Programs or code segments may be stored in media readable by a processor, and transmitted as computer data that is combined with carrier waves via a transmission media or a communication network.

The media readable by a processor include anything that can store and transmit information, such as, electronic circuits, semiconductor memory devices, ROM, flash memory, EEPROM, floppy discs, optical discs, hard discs, optical fiber, radio frequency (RF) networks, etc. The computer data also includes any data that can be transmitted via an electric network channel, optical fiber, air, electro-magnetic field, RF network, etc.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An apparatus to control a step motor, the apparatus comprising:
a memory storing data to drive the step motor;
a step motor driver driving the step motor;
a controller controlling the memory and the step motor driver, converting the data read from the memory into a predetermined step motor driving pulse, and outputting the step motor driving pulse to the step motor driver;
a watchdog timer checking a state of the step motor driving pulse and generating a reset request signal when there is a problem with the state of the step motor driving pulse; and
a reset timer generating a reset signal in response to the reset request signal generated by the watchdog timer.

2. The apparatus of claim 1, wherein the watchdog timer checks a central processing unit included in the controller and generates the reset request signal when the central processing unit is latched up.

3. The apparatus of claim 1, wherein the watchdog timer detects the step motor driving pulse and generates the reset request signal when a duty enable time of the step motor driving pulse exceeds a predetermined period of time.

4. The apparatus of claim 3, wherein the watchdog timer remains in a standby mode when a driving enable signal of the step motor is off.

5. The apparatus of claim 3, wherein the controller includes a central processing unit (CPU) processing data and signals related to controlling the step motor.

6. The apparatus of claim 5, wherein the watchdog timer checks the state of the CPU and generates the reset request signal when the CPU is latched up.

7. The apparatus of claim 6, wherein when the power of the apparatus is turned on, the reset timer initializes the CPU and a variety of input/output ports in response to the hardware reset signal generated by the reset circuit.

8. The apparatus of claim 1, wherein the controller controls a speed of the step motor by reading acceleration and deceleration table values stored in the memory.

9. A method of controlling a step motor used by an apparatus to control the step motor, the apparatus comprising: a memory storing data to drive the step motor, a step motor driver driving the step motor, and a controller controlling the memory and the step motor driver, converting the data read from the memory into a predetermined step motor driving pulse, and outputting the step motor driving pulse to the step motor driver; and the method comprising:
checking a state of the step motor driving pulse; and
resetting the apparatus when there is a problem with the state of the step motor driving pulse.

10. The method of claim 9, further comprising:
after the operation of checking the state of the step motor driving pulse, generating a reset request signal when there is a problem with the state of the step motor driving pulse; and generating a reset signal to reset the apparatus in response to the reset request signal, wherein the reset request signal is generated by a watchdog timer checking the state of the step motor driving pulse, and the reset signal is generated by the reset timer connected to the watchdog timer.

11. The method of claim 9, further comprising checking a central processing unit included in the controller and generating the reset request signal when the central processing unit is latched up.

12. The method of claim 9, further comprising detecting the step motor driving pulse and generating the reset request signal when a duty enable time of the step motor driving pulse exceeds a predetermined period of time.

13. A method of controlling a step motor controlled by a step motor controller, the method comprising:

converting data stored in a memory to drive the step motor into a predetermined step motor driving pulse;

checking a state of a step motor driving pulse and generating a reset request signal if a problem is detected with the state of the step motor driving pulse; and resetting the step motor controller when there is a problem with the state of the step motor driving pulse.

14. The method of claim 13, further comprising:

generating a reset request signal when there is a problem with the state of the step motor driving pulse; and generating a reset signal to reset the apparatus in response to the reset request signal.

15. The method of claim 14, wherein the reset request signal is generated by a watchdog timer checking the state of the step motor driving pulse, and the reset signal is generated by the reset timer connected to the watchdog timer.

16. The method of claim 13, further comprising checking a central processing unit included in the controller and generating the reset request signal when the central processing unit is latched up.

17. The method of claim 13, further comprising detecting the step motor driving pulse and generating the reset request signal when a duty enable time of the step motor driving pulse exceeds a predetermined period of time.

18. A computer readable storage medium containing a method of controlling a step motor controlled by a step motor controller, the method comprising:

storing data in a memory to drive the step motor;

converting the data read from the memory into a predetermined step motor driving pulse and outputting the step motor driving pulse to a step motor driver to drive the step motor;

checking a state of the step motor driving pulse; and resetting the step motor controller when there is a problem with the state of the step motor driving pulse.

19. The computer readable storage medium according to claim 18, further comprising:

generating a reset request signal when there is a problem with the state of the step motor driving pulse; and generating a reset signal to reset the step motor controller in response to the reset request signal.

20. The computer readable storage medium according to claim 19, wherein the reset request signal is generated by a watchdog timer checking the state of the step motor driving pulse, and the reset signal is generated by the reset timer connected to the watchdog timer.

21. The method of claim 18, further comprising checking a central processing unit included in the controller and generating the reset request signal when the central processing unit is latched up.

22. The method of claim 18, further comprising detecting the step motor driving pulse and generating the reset request signal when a duty enable time of the step motor driving pulse exceeds a predetermined period of time.

\* \* \* \* \*